US008838955B2

(12) United States Patent
Boring et al.

(10) Patent No.: US 8,838,955 B2
(45) Date of Patent: Sep. 16, 2014

(54) TWO-WAY, SECURE, DATA COMMUNICATION WITHIN CRITICAL INFRASTRUCTURES

(75) Inventors: Robert Boring, Greenville, SC (US); Richard Joseph Mitchell, Greenville, SC (US)

(73) Assignee: General Electric Company, Schenectady, NY (US)

( * ) Notice: Subject to any disclaimer, the term of this patent is extended or adjusted under 35 U.S.C. 154(b) by 219 days.

(21) Appl. No.: 13/216,873

(22) Filed: Aug. 24, 2011

(65) Prior Publication Data

US 2013/0054957 A1 Feb. 28, 2013

(51) Int. Cl.
*H04L 29/06* (2006.01)
*H04L 9/08* (2006.01)
(52) U.S. Cl.
CPC ........................................ *H04L 9/08* (2013.01)
USPC .................. 713/150; 709/230; 713/1; 710/53
(58) Field of Classification Search
None
See application file for complete search history.

(56) References Cited

U.S. PATENT DOCUMENTS

| 7,222,228 | B1* | 5/2007 | Stephens et al. | 713/1 |
| 2006/0253465 | A1* | 11/2006 | Willis et al. | 707/100 |
| 2007/0162609 | A1* | 7/2007 | Pope et al. | 709/230 |
| 2009/0083287 | A1* | 3/2009 | Bell et al. | 707/10 |
| 2009/0094250 | A1* | 4/2009 | Dhuse et al. | 707/10 |
| 2009/0276550 | A1* | 11/2009 | Megarity | 710/53 |

OTHER PUBLICATIONS

"Data Diodes in Support of Trustworthy Cyber Infrastructure" Apr. 21-23, Oak Ridge, Tennessee, USA Copyright 2010 ACM 978-1-4503-0017-9.*

* cited by examiner

*Primary Examiner* — Nirav B Patel
*Assistant Examiner* — Mohammed Waliullah
(74) *Attorney, Agent, or Firm* — Sutherland, Asbill & Brennan, LLP

(57) ABSTRACT

Systems and methods for two-way, secure, data communication within critical infrastructures are usable to protect critical infrastructure information while allowing real-time monitoring and remote access. Such communication systems and methods can be used to protect critical data by, for example, providing a single point of access via unidirectional, serial, non-routable connections. Additionally, data flow may be controlled by a first server that is not accessible outside of the critical infrastructure.

17 Claims, 3 Drawing Sheets

TWO-WAY, SECURE, DATA COMMUNICATION WITHIN CRITICAL INFRASTRUCTURES

FIELD OF THE INVENTION

Embodiments of the invention relate generally to secure data communications, and more particularly, to two-way, secure data communications within critical infrastructures and systems.

BACKGROUND

Remote monitoring of critical assets, such as data associated with electrical power plants, requires providing critical information over network connections such as the Internet. Protecting this information from malicious or competing entities, however, is a constant concern. Finding ways to allow remote monitoring of critical data while maintaining the security of the critical data continues to be a priority.

SUMMARY

Some or all of the above needs and/or problems may be addressed by certain embodiments of the invention. Certain embodiments may include two-way, secure, data communication between two computing devices (e.g., servers) for transmitting and protecting critical assets within a critical infrastructure. According to one embodiment of the invention, there is disclosed a system comprising a first server operable to receive a unique datagram from a second server, decrypt the unique datagram, verify data from the unique datagram, and when the data is verified, package and encrypt critical data into a second unique datagram and transmit the second unique datagram to the second server based at least in part on an instruction from the second server.

According to another embodiment of the invention, there is disclosed a method performed by a first server for receiving a unique datagram from a second server, decrypting the unique datagram, verifying data from the unique datagram, and when the data is verified, packaging and encrypting critical data into a second unique datagram and transmitting the second unique datagram to the second server based at least in part on an instruction from the first server.

Further, according to another embodiment of the invention, there is disclosed a system comprising a first and second server operable to receive a unique datagram from the second server via at least one unidirectional serial link based on an instruction from the second server, decrypt the unique datagram based at least in part on configuration information stored in the first or second server, and verify data from the unique datagram. According to this embodiment, when the data is verified, the first server may package and encrypt critical data into a second unique datagram and transmit, to the second server via at least one unidirectional serial link based on an instruction from the second server, the encrypted second unique datagram; however, when the data is not verified, the first server may transmit, to the second server via at least one unidirectional serial link, a retransmit request and may receive a retransmitted unique datagram.

Other embodiments, systems, methods, aspects, and features of the invention will become apparent to those skilled in the art from the following detailed description, the accompanying drawings, and the appended claims.

BRIEF DESCRIPTION OF THE DRAWINGS

The detailed description is set forth with reference to the accompanying drawings, which are not necessarily drawn to scale. In the figures, the left-most digit(s) of a reference number identifies the figure in which the reference number first appears. The use of the same reference numbers in different figures indicates similar or identical items.

DETAILED DESCRIPTION

Figure 1:
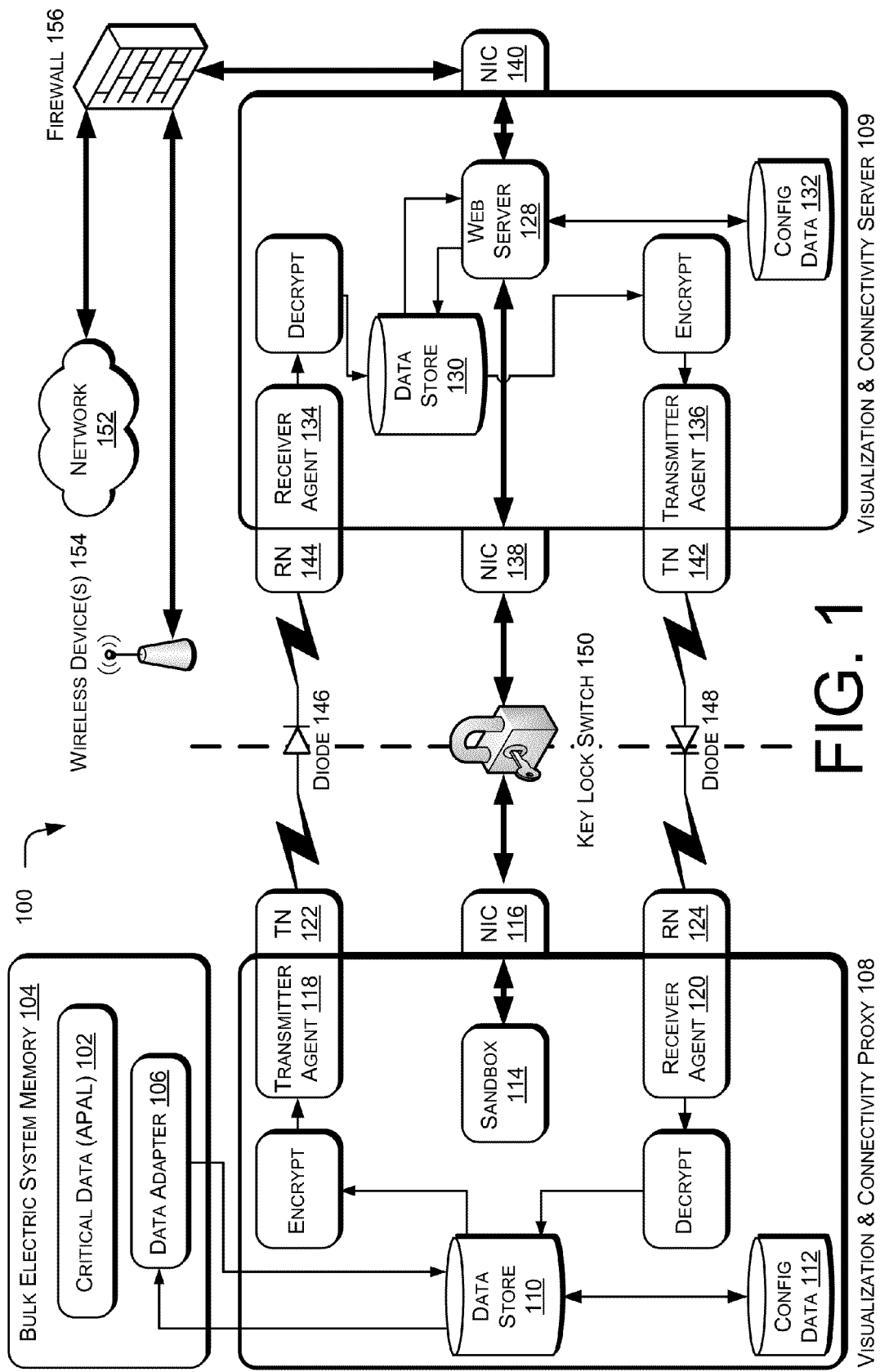
FIG. 1 is a block diagram of an illustrative system for two-way secure data communication within a critical infrastructure, according to an embodiment of the invention.

Illustrative embodiments of the invention will now be described more fully hereinafter with reference to the accompanying drawings, in which some, but not all embodiments of the invention are shown. The invention may be embodied in many different forms and should not be construed as limited to the embodiments set forth herein; rather, these embodiments are provided so that this disclosure will satisfy applicable legal requirements. As noted above, like numbers refer to like elements throughout.

Illustrative embodiments of the invention are directed to, among other things, a system for two-way secure data communication between one or more servers within a critical infrastructure. As an overview, critical assets (hereinafter, "critical data") of a power station may be stored within a critical computing device infrastructure. Such critical data may include input data, output data, timing data, power/electricity consumption data, power/electricity production data, etc., of a power station. This data may be "critical" because it is proprietary to the power plant and/or to an operator of the power plant. Further, in one aspect, a power plant may be any type or combination of power plants, such as nuclear, gas, fossil, power, hydroelectric, wind turbine, photovoltaic, or the like. Critical data, about the plant may be generated, collected, and/or stored within the critical infrastructure.

In some instances, two or more servers, or other computing devices, may communicate power plant data via direct, two-way communication. In this way, conventional cyber security methods, including, but not limited to, firewalls, user authentication, etc., may be employed. Conventional key lock switches and software sandboxes may be implemented as well. Additionally, the servers may also be configured to share data via one or more one-way data communication diodes. As such, the servers may send and receive, with one another, numeric data as a continuous, concatenated datagram. In some aspects, datagrams may be unique in that each datagram is different from the last and generated for each particular transmission. Further, concatenation and parsing of the datagrams may be implemented by utilizing an installation-specific, unshared configuration file, the contents of which are only known by the servers connected via the one-way diodes.

In some instances, the power plant may utilize an Advanced Plant Application Layer (APAL), or other application layer implementation, to standardize the data in the power plant. For example, an APAL may convert power plant data into a common language for controlling the hardware of the power plant or of other power plants using an APAL, or other similar application layer. In this way, different applications that interact with different pieces of plant hardware may be able to utilize the critical data. Similarly, the critical data may be more readily shared with, and/or used by, other power plants.

In some instances, critical data may be stored in one or more computer-readable memories of a computing device that includes internal communication between a local data store and the critical data as well as external communication between the local data store and another computing device, such as a Web server. By way of example only, internal communication may include accessing the APAL data and copying portions thereof into a local memory, such as a Web server data store. Additionally, in some aspects, external communication may include receiving instructions and providing APAL data to a Web server that may be accessed by a user, service provider, power plant operator, or the like.

FIG. 1 depicts an illustrative architecture 100 in which techniques for two-way, secure, data communication within a critical infrastructure may be implemented using two servers. In architecture 100, critical data 102 (hereinafter, "APAL data 102") may be stored in a secure memory location, such as a bulk electric system memory 104, or other private computer-readable memory, and may be accessible via a data adapter 106 of the memory or bulk electric system. In this way, the APAL data 102 may be stored securely and may be accessible via direct connection to the data adapter 106 of the bulk electric system memory 104.

As noted above, in some instances, two or more servers may be configured to securely communicate continuous, concatenated datagrams with one another. In some instances, these servers may be implemented as a proxy server, such as a Visualization and Connectivity Proxy (VCP) 108 and a non-proxy server, such as a Visualization and Connectivity Server (VCS) 109. VCP 108 and VCS 109 may communicate with one another via both direct, two-way communication links and one-way diodes. Further, in some instances, either the VCP 108 or the VCS 109 may be solely responsible for providing instructions to transfer data. In other words, in some examples, the VCP 108 may initiate all data transfer between the two servers, while in other examples, the VCS 109 may initiate all data transfer between the two servers.

As shown in FIG. 1, the VCP 108 may include a data store 110, configuration data 112, an application program such as a sandbox application 114, a network interface card (NIC) 116, at least one transmitter agent 118, and at least one receiver agent 120 for communicating with, and receiving APAL data 102 from, the data adapter 106 of the bulk electric system memory 104. In one example, the transmitter agent 118 and the receiver agent 120 may be coupled to unidirectional, serial data nodes such as transmitter node (TN) 122 and receiver node (RN) 124, respectively, for transmitting and/or receiving data to and/or from a second server, such as the VCS 109. These unidirectional, serial nodes TN 122 and RN 124 may be implemented as RS-422 transmitter/receivers or any other type of unidirectional, serial transmitter/receiver such as, but not limited to, RS-232, RS-485, RS-423, or the like.

By way of example only, a web server, or web server adapter 128 implemented as hardware or software in the VCS 109, may control information flow between the VCS 109 and the VCP 108. The VCS 109 or server may also include a data store 130, configuration data 132, a receiver agent 134, a transmitter agent 136, and two separate NICs 138 and 140. Much like the transmitter agent 118 and the receiver agent 120 of the VCP 108, the transmitter agent 136 and receiver agent 134 of the VCS 109 may include a unidirectional TN 142 and a unidirectional RN 144, respectively. In some aspects, the TN 122 of the transmitter agent 118 may transmit data to the RN 144 of the receiver agent 134 through a diode 146. Similarly, the TN 142 may transmit data to the RN 124 via a diode 148. Diodes 146 and 148 may be implemented using any known standard, such as, but not limited to, RS-422, RS-232, RS-485, RS-423, or the like.

In certain embodiments, the transmitter agents 118 and 136, of the two servers respectively, may transmit private, binary, encrypted data packets across one-way, non-routable paths to receiver agents 134 and 120, respectively, as shown in FIG. 1. However, other types and methods of transmission are possible. In some aspects, when external connectivity is requested, a physical key lock switch 150 may be used to allow updates, maintenance, etc., via NICs 116 and 138. Additionally, data or applications uploaded to the critical infrastructure via the key lock switch 150 may be stored via the sandbox application 114 and subject to external validation. For example, the data may be validated by verifying locally generated hash and checksum values against values that are provided by the site via another method, such as email, telephone, or the like. This information may also be scanned and tested by, or via, the sandbox application 114 prior to deployment.

In some examples, the NIC 140 may connect the VCS 109 with a network 152, such as the Internet or other private or public network, and/or wireless device(s) 154 with direct connections. Either way, a firewall 156, or other network security scheme, may act as initial protection to the VCS 109 and VCP 108 from the outside world. Additionally, configuration data 112 and 132 may include information for encrypting and/or decrypting data, as well as for creating checksums and interpreting and/or verifying data against the checksums.

In one instance, a user may log into the web server 128 via a device utilizing the network 152, or via a wireless device 154, for accessing critical data stored in memory 104. Upon authentication of the user, the web server 128 may provide a home screen. In some examples, the web server 128 may issue a service request to the data store 130 for a current web page that may include critical APAL data 102. This request may then be sent to the transmitter agent 136, where the transmitter agent 136 may package the data, adding an identifier (ID) and checksum data. The transmitter agent 136 may also encrypt the data and place it in the send queue. The transmitter agent 118 may then issue a request to the receiver agent 134 to send the data in the send queue. After the transmitter agent 136 sends the data in the send queue to the receiver agent 120 of the VCP 108, the receiver agent 120 may decrypt the data and verify it against the checksum data.

If the data is not verified, the receiver agent 120 may send a message to the transmitter agent 118 of the VCP 108 to request a retransmission of data. Upon sending the retransmission request to the receiver agent 134 of the VCS 109, the transmitter agent 136 of the VCS 109 may resend the data in the send queue. Alternatively, if the data is verified, the receiver agent 120 of the VCP 108 may send a service request from the data store 110 to the data adapter 106 of the memory 104. The data adapter 106 may access and send the APAL data 102 back to the data store 110 where it may be packaged and encrypted prior to handing it to the transmitter agent 118 of the VCP 108. In some examples, sending and/or validating/verifying the APAL data 102 to the VCS 109 may be implemented in the same way that the request and data were sent to the VCP 108. Once APAL data 102 is finally received (unpackaged, verified, and decrypted) at the data store 130 of the VCS 109, the data may be presented to a user via the web server 128.

The technical effects of certain embodiments of the invention may include isolating (i.e., protecting) critical infrastructure data from the outside world while simultaneously providing encrypted, real-time monitoring and/or secure remote access to this data.

Figure 2:
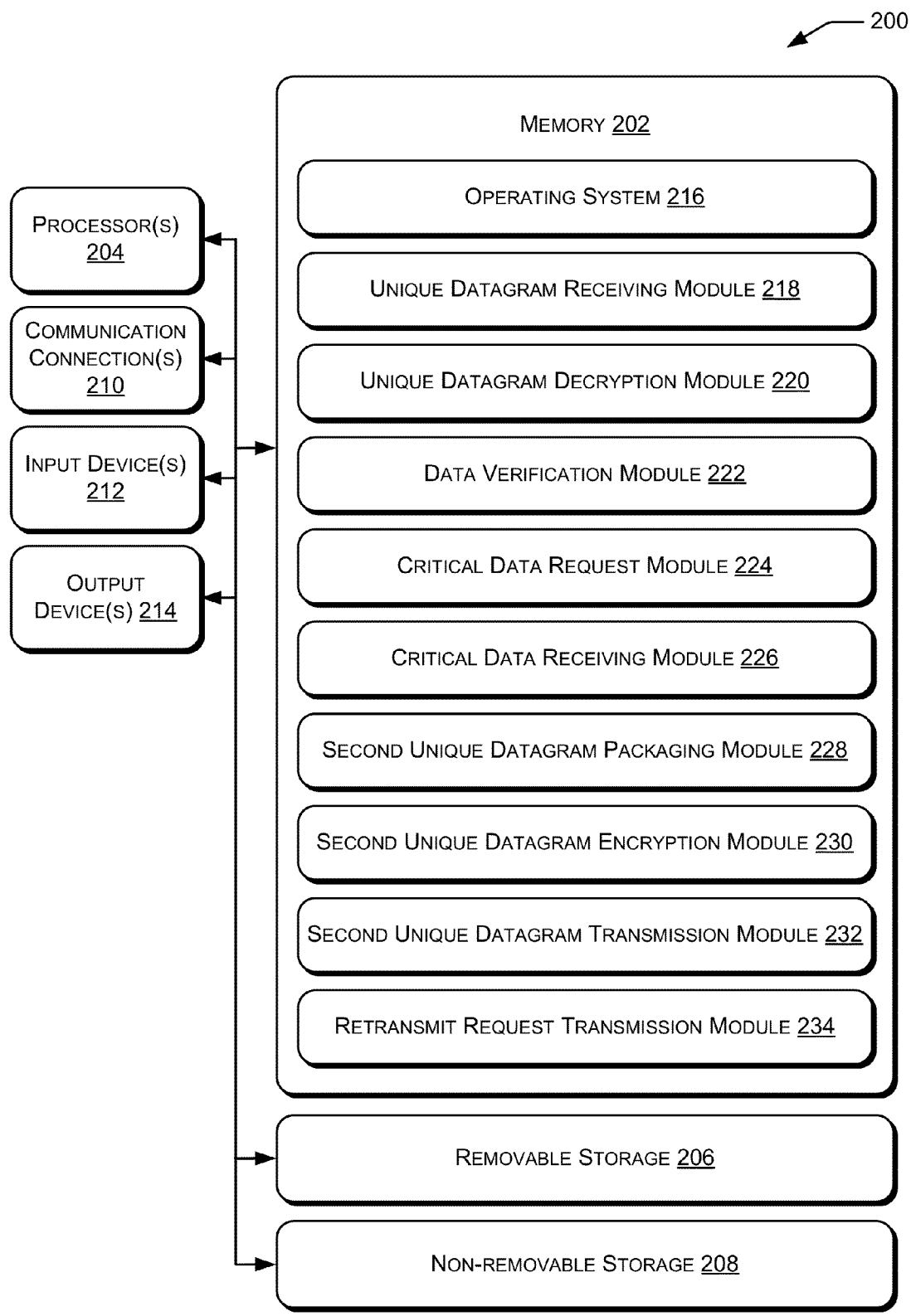
FIG. 2 is a block diagram of a computer environment showing an illustrative system in which two-way secure data communication within a critical infrastructure can be implemented, according to an embodiment of the invention.

FIG. 2 provides an illustrative overview of one example computing environment 200, in which aspects of the invention may be implemented. The computing environment 200 may be configured as any suitable computing device capable of implementing a system for two-way, secure, data communication within a critical infrastructure, such as either VCP 108 or VCS 109. By way of example and not limitation, suitable computing devices may include personal computers (PCs), servers, server farms, data centers, or any other device capable of storing and executing all or part of the computing environment 100.

In one illustrative configuration, the computing environment 200 comprises at least a memory 202 and one or more processing units (or processor(s)) 204. The processor(s) 204 may be implemented as appropriate in hardware, software, firmware, or combinations thereof. Software or firmware implementations of the processor(s) 204 may include computer-executable or machine-executable instructions written in any suitable programming language to perform the various functions described.

Memory 202 may store program instructions that are loadable and executable on the processor(s) 204, as well as data generated during the execution of these programs. Depending on the configuration and type of computing environment 200, memory 202 may be volatile (such as random access memory (RAM)) and/or non-volatile (such as read-only memory (ROM), flash memory, etc.). The computing device or server may also include additional removable storage 206 and/or non-removable storage 208 including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 202 may include multiple different types of memory, such as static random access memory (SRAM), dynamic random access memory (DRAM), or ROM.

Memory 202, removable storage 206, and non-removable storage 208 are all examples of computer-readable storage media. For example, computer-readable storage media may include volatile and non-volatile, removable and non-removable media implemented in any method or technology for storage of information such as computer-readable instructions, data structures, program modules or other data. Memory 202, removable storage 206, and non-removable storage 208 are all examples of computer storage media. Additional types of computer storage media that may be present include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile discs (DVD) or other optical storage, magnetic cassettes, magnetic tape, magnetic disk storage or other magnetic storage devices, or any other medium which can be used to store the desired information and which can accessed by the server or other computing device. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

The computing environment 200 may also contain communication connection(s) 210 that allow the computing environment 200 to communicate with a stored database, another computing device or server, user terminals, and/or other devices on a network, such as wireless device(s) 154 of FIG. 1.

The computing environment 200 may also include input device(s) 212 such as a keyboard, mouse, pen, voice input device, touch input device, etc., and output device(s) 214, such as a display, speakers, printer, etc.

Turning to the contents of the memory 202 in more detail, the memory 202 may include an operating system 216 and one or more application programs or services for implementing the features disclosed herein including a unique datagram receiving module 218. The unique datagram receiving module 218, as described above, may be configured to receive unique datagrams from a second server. Receiver agents 120 and 134 of FIG. 1 are examples of at least one type of unique datagram receiving module. The memory 202 may also include a unique datagram decryption module 220 and a data verification module 222. In some instances, the unique datagram decryption module 220 may utilize configuration information, such as configuration data 112 and/or 132, to decrypt the packages received by the unique datagram receiving module 218. Further, the data verification module 222 may also utilize the configuration module to verify the package decrypted by the unique datagram decryption module 220. Alternatively, or in addition, the data verification module 222 may verify the data by checking it against a checksum value that was packaged with the unique datagram. That is, the provider of the unique datagram may have created a checksum value and packaged it with the encrypted unique datagram. In this case, the verification may be based on the checksum value and/or additional configuration information.

The memory 202 may also include a critical data request module 224 and a critical data receiving module 226. In some instances, the critical data request module 224 may be configured to request APAL data 102 from a computer-readable memory of the bulk electric system memory 104, or other secure location. When the bulk electric system memory 104 responds by sending the APAL data 102, it may be received by the critical data receiving module 226.

The memory 202 may further include a second unique datagram packaging module 228, a second unique datagram encryption module 230, and a second unique datagram transmission module 232. In some aspects, the second unique datagram packaging module 228 may be configured to package the data received by the critical data receiving module 226 with a checksum value and a particular ID. This information may be used to verify/validate that the critical data was received correctly at the other end. The second unique datagram encryption module 230 may be configured to utilize local configuration information, for example, from the configuration data 112 of the VCP 108, to encrypt the package. Further, the second unique datagram transmission module 232 may be configured to transmit the encrypted package to another computing device, such as the VCS 109. As noted above, in some aspects, the transmission may be implemented via an RS-422 or other type of connection.

Further, the memory 202 may include a retransmit request transmission module 234. In some aspects, the retransmit request transmission module 234 may be configured to transmit retransmit requests to another computing device, such as the VCS 109, when the received data is not verified by the data verification module 222.

Various instructions, methods, and techniques described herein may be considered in the general context of computer-executable instructions, such as program modules, executed by one or more computers or other devices. Generally, program modules include routines, programs, objects, components, data structures, etc., for performing particular tasks or implementing particular abstract data types. These program modules and the like may be executed as native code or may be downloaded and executed, such as in a virtual machine or other just-in-time compilation execution environment. Typically, the functionality of the program modules may be combined or distributed as desired in various embodiments. An implementation of these modules and techniques may be stored on some form of computer-readable storage media.

The example architecture 100 and computing environment 200 shown in FIGS. 1 and 2 are provided by way of example only. Numerous other operating environments, system architectures, and device configurations are possible. Accordingly, embodiments of the present invention should not be construed as being limited to any particular operating environment, system architecture, or device configuration.

Figure 3:
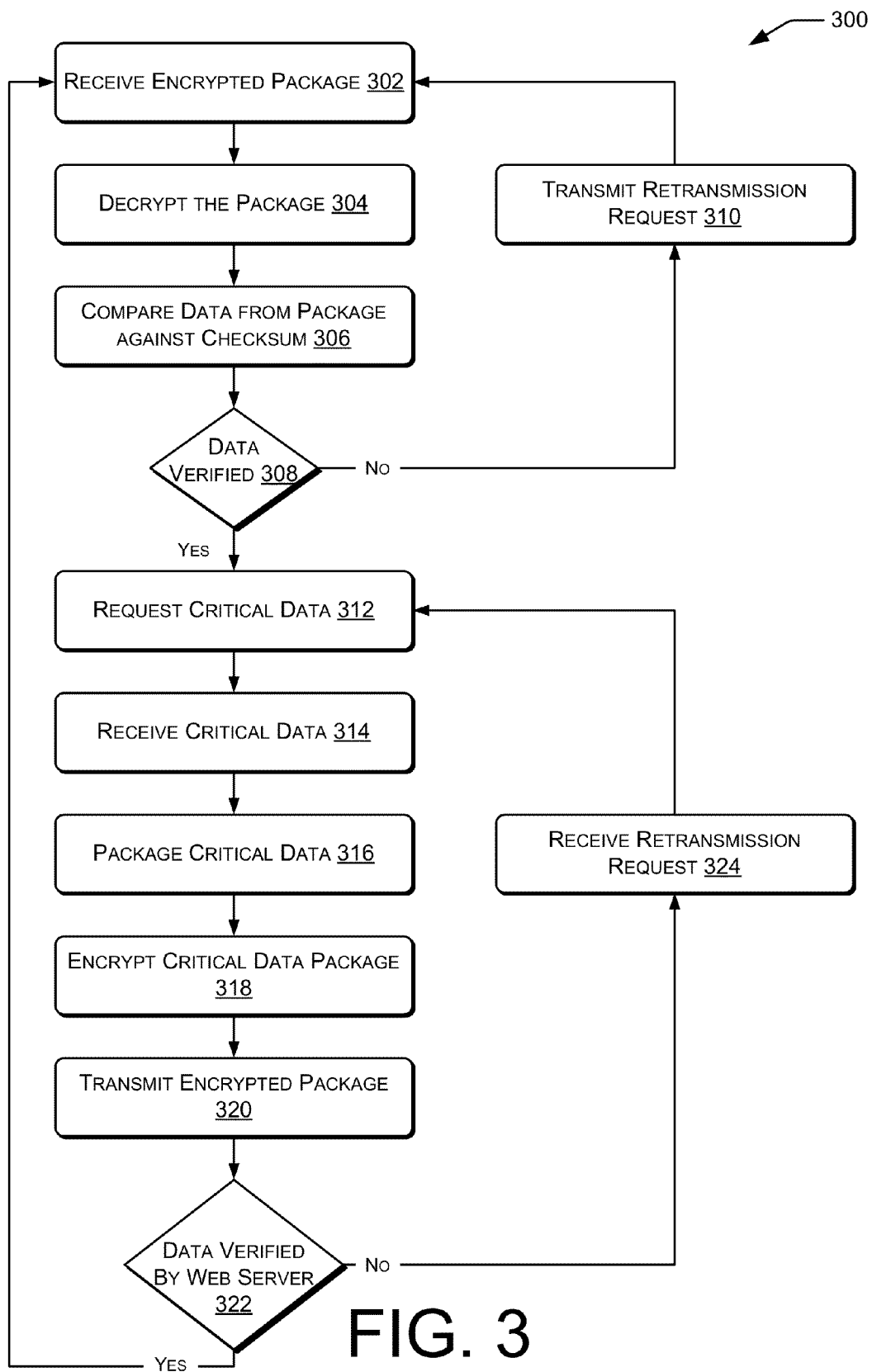
FIG. 3 is a flow diagram illustrating details of a method for two-way secure data communication within a critical infrastructure, according to an embodiment of the invention.

FIG. 3 is a flow diagram of an illustrative process 300 for implementing two-way, secure, data communication within critical infrastructures, as described with reference to FIGS. 1 and 2. As noted above, the illustrative process 300 may be utilized to protect assets, such as critical data, within a critical infrastructure using multiple servers, two-way communication links, and one-way communication links. In one example, the illustrative VCP 108, the illustrative VCS 109, or the example computing environment 200 may perform any or all of the operations of process 300. Additionally, in some aspects, the process 300 may be implemented by the illustrative VCP 108, or other server, in communication with the illustrative VCS 109, or other server. Alternatively, in other aspects, the process 300 may be implemented by the illustrative VCS 109, or other server, in direct communication with the illustrative VCP 108, or other server.

This process is illustrated as a logical flow graph, in which each operation represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

In this particular implementation, the process 300 may begin at block 302 in which the process 300 may receive an encrypted package, or unique datagram, from another computing device, or Web server, such as the VCS 109 and/or the Web server 128. At block 304 the process 300 may decrypt the package, or unique datagram, using any known or appropriate decryption method, or it may utilize configuration information stored locally, such as configuration data 112 of the VCP 108. Upon decryption of the package, the contents of the package may be utilized to verify the data. That is, the package may contain data, a checksum value, and/or unique ID. At block 306, the process 300 may utilize this unpackaged information to compare the data against the checksum value.

If the data is not verified at block 308, meaning that the data does not match the checksum value from the package, the process 300 may transmit a retransmission request, for example via transmitter agent 118, at block 310 and then the process 300 may return to block 302 to receive another encrypted package. Alternatively, if the data is verified at block 308, meaning that the data matches the checksum value from the package, the process 300 may request critical data at block 312. In some instances, requesting critical data may include sending a request to a remote memory location or another computing device, such as the bulk electric system memory 104 of FIG. 1. However, in other examples, requesting critical data may include sending a request to a controller that manages local data or sending a request to a local memory location directly.

At block 314, the process 300 may receive the critical data; at block 316, the process may package the critical data (e.g., with a unique ID and/or a checksum value); at block 318, the process may encrypt the critical data package (e.g., using local or remote configuration information and/or any known encryption methods); and at block 320, the process 300 may transmit the encrypted package. As noted above, the transmission of the encrypted package may be implemented by a transmitter agent, such as transmitter agent 118 and/or 136. Additionally, as noted above, the transmission may occur over a non-routable, unidirectional, secure path, such as via an RS-422 connection.

If the transmitted data is verified by the receiver of the encrypted package (e.g., the receiver agent 134 of the VCS 109) at block 322, the process 300 may return to block 302 to receive the next encrypted package. On the other hand, if the data is not verified at the receiving end, the process 300 may receive a retransmission request from the receiving party at block 324. This may indicate the data in the package did not match the checksum value and that the receiving party would like another package to replace the unverified data. The process 300 may then return to block 312 to request critical data again. Process 300 may continue to iterate from blocks 312 through 324 until the data is verified at block 322 and/or a predefined time period is reached.

Illustrative systems and methods of two-way secure data communication are described above. Some or all of these systems and methods may, but need not, be implemented at least partially by an architecture such as that shown in FIGS. 1 and/or 2. It should be understood that certain acts in the methods need not be performed in the order described, may be rearranged or modified, and/or may be omitted entirely, depending on the circumstances. Also, any of the acts described above with respect to any method may be implemented by a processor or other computing device based on instructions stored on one or more computer-readable storage media.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments.

That which is claimed:

1. A system, comprising:
  at least one memory of a first server that stores computer-executable instructions;
  at least one processor of the first server configured to access the at least one memory of the first server, wherein the at least one processor of the first server is configured to execute the computer-executable instructions to:
  receive, from a second server, via a first unidirectional serial link, a first unique datagram comprising at least data and a checksum value, wherein the first unique datagram comprises a first plurality of unique datagrams concatenated based at least in part on a second configuration file associated with the second server;
decrypt the first unique datagram;
verify data from the first decrypted unique datagram against the checksum value; and
when the data is verified:
combine data associated with operation of a power plant and an associated checksum value into a second unique datagram;
encrypt the second unique datagram;
concatenate a second plurality of unique datagrams comprising the encrypted second unique datagram, wherein the concatenation of the second plurality of unique datagrams is based at least in part on a first configuration file associated with the first server, wherein the first configuration file and the second configuration file comprise installation-specific configuration files that are accessible only via the first unidirectional serial link or a second unidirectional serial link, wherein the first configuration file has contents that are the same as contents of the second configuration file, and wherein the first configuration file configures the first server to share the data with the second server using the second unidirectional serial link; and
transmit, to the second server, via the second unidirectional serial link, at least a portion of the second plurality of unique datagrams.

2. The system of claim 1, wherein the at least one processor of the first server is further configured to execute the computer-executable instructions to:
when the data is not verified:
transmit, to the second server, via the second unidirectional serial link, a retransmit request; and
receive, from the second server, via the first unidirectional serial link, a retransmitted first unique datagram comprising at least data and the checksum value.

3. The system of claim 1, wherein the at least one processor of the first server is further configured to execute the computer-executable instructions to:
when the data is verified:
transmit, to a critical data store of the first server, a request for critical data; and
receive, from the critical data store of the first server, the critical data.

4. The system of claim 1, wherein the first unique datagram is received from the second server based at least in part on an instruction from the second server.

5. The system of claim 1, wherein the first and second servers are coupled via the first and the second unidirectional serial links.

6. The system of claim 5, wherein the first and the second unidirectional serial links comprise respective diodes.

7. The system of claim 1, wherein the decryption of the first unique datagram is based at least in part on the first configuration file, wherein the first configuration file is stored in the at least one memory of the first server and the second configuration file is stored in at least one memory of the second server.

8. The system of claim 1, wherein the first unique datagram comprises numeric data only sent as a continuous, concatenated datagram.

9. A method performed at a first server, comprising:
receiving, from a second server, via a first unidirectional serial link, a first unique datagram comprising at least data and a checksum value, wherein the first unique datagram comprises a first plurality of unique datagrams concatenated based at least in part on a second configuration file associated with the second server;
decrypting the unique datagram;
verifying data from the first decrypted unique datagram against the checksum value; and when the data is verified:
combining data associated with operation of a power plant and an associated checksum value into a second unique datagram;
encrypting the second unique datagram;
concatenating a second plurality of unique datagrams comprising the second unique datagram, the concatenation of the second plurality of unique datagrams based at least in part on a first configuration file associated with the first server, wherein the first configuration file and the second configuration file comprise installation-specific configuration files that are accessible only via the first unidirectional serial link or a second unidirectional serial link, wherein the first configuration file has contents that are the same as contents of the second configuration file, and wherein the first configuration file configures the first server to share the data with the second server using the second unidirectional serial link; and
transmitting, to the second server, via the second unidirectional serial link, at least a portion of the second plurality of unique datagrams.

10. The method of claim 9, further comprising:
when the data is not verified:
transmitting, to the second server, via the second unidirectional serial link, a retransmit request; and
receiving, from the second server, via the first unidirectional serial link, a retransmitted first unique datagram comprising data and the checksum value.

11. The method of claim 9, further comprising:
when the data is verified:
transmitting, to a critical data store of the first server, a request for critical data; and
receiving, from the critical data store of the first server, the critical data.

12. The method of claim 9, wherein the first unique datagram is received from the second server based at least in part on an instruction from the first server.

13. The method of claim 9, wherein the first and second servers are coupled via the first and the second unidirectional serial links.

14. The method of claim 13, wherein the first and the second unidirectional serial links comprise respective diodes.

15. The method of claim 9, wherein the decryption of the unique datagram is based at least in part on the first configuration file, wherein the first configuration file is stored in the at least one memory of the first server and the second configuration file is stored in at least one memory of the second server.

16. The method of claim 9, wherein the unique datagram comprises numeric data only sent as a continuous, concatenated datagram.

17. A system, comprising:
a first server and a second server coupled via a first unidirectional serial link and a second unidirectional serial link,
at least one memory of the first or second server that stores computer-executable instructions;
at least one processor of the first or second server configured to access the at least one memory of the first or second server, wherein the at least one processor of the first or the second server is configured to execute the computer-executable instructions to:

receive, from the second server via the first unidirectional serial link, a first unique datagram comprising data, an identifier (ID), and a checksum value, wherein the second server initiates transmission of the unique datagram, and wherein the first unique datagram comprises a first plurality of unique datagrams concatenated based at least in part on a second configuration file associated with the second server;

decrypt, by the first server, the first unique datagram based at least in part on a first configuration file stored in the at least one memory of the first server;

verify, by the first server, data from the first unique datagram against the checksum value; and when the data is verified:

combine, by the first server, data associated with operation of a power plant, an ID, and an associated checksum value into a second unique datagram;

encrypt, by the first server, the second unique datagram;

concatenate, by the first server, a second plurality of unique datagrams comprising the encrypted second unique datagram, wherein the concatenation of the second plurality of unique datagrams is based at least in part on a second configuration file, wherein the first configuration file and the second configuration file comprise installation-specific configuration files that are accessible only via the first unidirectional serial link or the second unidirectional serial link, wherein the first configuration file has contents that are the same as contents of the second configuration file, and wherein the first configuration file configures the first server to share the data with the second server using the second unidirectional serial link; and transmit, to the second server via the second unidirectional serial link, at least a portion of the second plurality of unique datagrams, wherein the second server initiates the transmission of the at least a portion; and when the data is not verified:

transmit, to the second server via the second unidirectional serial link, a retransmit request; and receive, from the second server via the first unidirectional serial link, a retransmitted unique datagram comprising data, an ID, and a checksum value.

* * * * *